United States Patent

[11] 3,590,796

| [72] | Inventors | Joseph R. Harkness<br>Germantown;<br>Felix J. Stuckert, Wauwatosa, both of, Wis. |
|---|---|---|
| [21] | Appl. No. | 878,358 |
| [22] | Filed | Nov. 20, 1969 |
| [45] | Patented | July 6, 1971 |
| [73] | Assignee | Briggs & Stratton Corporation<br>Wauwatosa, Wis. |

[54] FREE VALVE COMPRESSION RELIEF FOR FOUR CYCLE ENGINES
3 Claims, 4 Drawing Figs.

[52] U.S. Cl. ..................................... 123/182,
 123/90.5, 123/90.67
[51] Int. Cl. ....................................... F01l 13/08
[50] Field of Search ........................... 123/182, 90
 C, 90.5, 90.67

[56] References Cited
UNITED STATES PATENTS

| 2,165,239 | 7/1939 | Douglas et al. ............... | 123/90 |
| 3,306,276 | 2/1967 | Harkness et al. ............. | 123/182 |
| 3,307,527 | 3/1967 | Weglage et al. .............. | 123/182 |
| 3,403,667 | 10/1968 | Santi ........................... | 123/182 |

*Primary Examiner*—Al Lawrence Smith
*Attorney*—Ira Milton Jones

ABSTRACT: In a free valve compression relief arrangement for a four-stroke cycle engine, like that of Harkness et al. U.S. Pat. No. 3,306,276, wherein the valve has a lost motion connection with the retainer for its spring, the spring retainer is maintained in its free valve position at predetermined times in the engine cycle when the valve is within a small distance from its seat by means of an auxiliary cam and an auxiliary tappet. Otherwise, the retainer transmits spring force to the valve so that the valve is positively controlled by its spring and cam actuating mechanism.

PATENTED JUL 6 1971

3,590,796

INVENTORS
Joseph R. Harkness
Felix J. Stuckert
BY
ATTORNEY

FREE VALVE COMPRESSION RELIEF FOR FOUR CYCLE ENGINES

This invention relates to means for improving starting torque in four-stroke cycle engines, and more particularly to improvements in compression relief arrangements of the general type disclosed in Harkness et al. U.S. Pat. No. 3,306,276.

The major portion of the torque that must be applied to the crankshaft of a reciprocating engine when it is being started is needed to overcome gas pressure differences across the piston, and particularly the increasing pressure that is built up in the combustion chamber during the compression stroke. Various expedients have been proposed for permitting controlled escape of gas from the combustion chamber during the compression stroke at times when the engine is being started. The above-mentioned Harkness et al. patent discloses one such compression relief arrangement having the advantage, as compared with prior compression relief expedients, of also providing for restricted flow of gas into the combustion chamber in the event the charge therein does not fire during the subsequent combustion stroke, to relieve the suction on the piston that would otherwise develop as a consequence of compression relief.

In the arrangement of the Harkness et al. patent, one of the poppet valves that controls flow of gases into and out of the combustion chamber—and it can be either the intake valve or the exhaust valve—is left substantially free to move through a small distance to and from its seat during certain portions of the compression and combustion strokes, so that the valve is then responsive to gas pressure across it.

The actuating mechanism for that valve, which controls it during other portions of the cycle, is generally conventional. It comprises a spring by which the valve is urged towards its seat, and a cam on a camshaft that rotates in timed relation to the engine cycle, which cam cooperates with the spring to positively establish the position of the valve at all times that the valve is more than a predetermined small distance from its seat.

However, the valve has a lost motion connection with a spring retainer against which the spring reacts; and during those portions of the engine cycle in which the valve is intended to be pressure responsive, the spring retainer is confined in such a position that it cannot compel the valve to engage its seat but instead merely serves to define a limit of motion of the valve away from its seat.

Where the lost motion connection between the valve and the spring retainer is utilized for relieving pressure in the combustion chamber during the compression stroke, the valve is lightly biased away from its seat, as by a small spring reacting between it and the spring retainer, so that the valve is seated whenever combustion chamber pressure exceeds a value determined by the biasing force of that small spring. Hence when the engine is being cranked, and combustion chamber pressure rises relatively slowly during the compression stroke, the valve remains slightly open to permit controlled escape of gas; but when the engine is running and such pressure rises rapidly, the valve remains seated all through the compression stroke so that there is no loss of power and engine operation is in all respects normal. The arrangement likewise permits the valve to remain at a small distance from its seat during an unfired combustion stroke, to admit air to the cylinder for relieving suction; but when the engine is running the valve is kept seated all through the combustion stroke by the pressure of the combusting gases.

While generally satisfactory, the expedient of the Harkness et al. patent, which can be characterized as a free valve arrangement, posed certain problems during portions of the engine cycle.

Thus, where the free valve was the exhaust valve, the freedom of the valve to move relative to its actuating mechanism tended to create difficulties as the valve was moved onto its seat at the conclusion of an exhaust opening. With such an arrangement (see FIG. 8 of U.S. Pat. No. 3,306,276) provision was made for free motion of the exhaust valve in the desired portions of the stroke by means of a tappet that had a cup-shaped upper portion which engaged only the spring retainer. The cam for the valve was so shaped that it cooperated with the tappet to position the spring retainer for pressure responsive motion of the valve during those portions of the cycle where such freedom was desired, but it was cut down around part of its periphery to dispose the retainer in a position which insured firm seating of the valve during the intake stroke.

As this valve was accelerated towards its seat near the conclusion of its exhaust opening, it remained at the limit of its lost motion travel relative to the spring retainer. As the spring retainer approached the valve-closed position, the spring retainer was decelerated by the cam, but the valve, due to its inertia, continued to move toward the closed position at high speed and slammed onto its seat abruptly. One approach to the solution of this problem was to so shape the cam that the spring retainer would be decelerated over a longer portion of valve closing motion, so that the valve could catch up to the spring retainer just before the valve engaged its seat. The valve could then move onto its seat under the control of the retainer, rather than in the course of motion relative to it. This approach, however, was complicated by practical problems of cam design.

By contrast, it is an object of the present invention to provide a four-cycle engine having a free-valve compression relief arrangement wherein the valve that provides for compression relief is under positive control of its actuating mechanism during all but those portions of the engine cycle in which it must have limited freedom for pressure responsive motion.

Thus it is another object of this invention to provide a compression relief arrangement of the free-valve type disclosed in the Harkness et al. patent which provides for firm but relatively gradual seating of the valve in that portion of the engine cycle in which the valve must be firmly moved onto its seat, without entailing complications or unusual features in the design of the cam which actuates the valve.

With these observations and objectives in mind, the manner in which the invention achieves its purpose will be appreciated from the following description and the accompanying drawings which exemplify the invention, it being understood that such changes in the specific apparatus disclosed herein may be made as come within the scope of the appended claims.

The accompanying drawings illustrate two complete examples of embodiments of the invention constructed according to the best modes so far devised for the practical application of the principles thereof, and in which.

Figure 1:
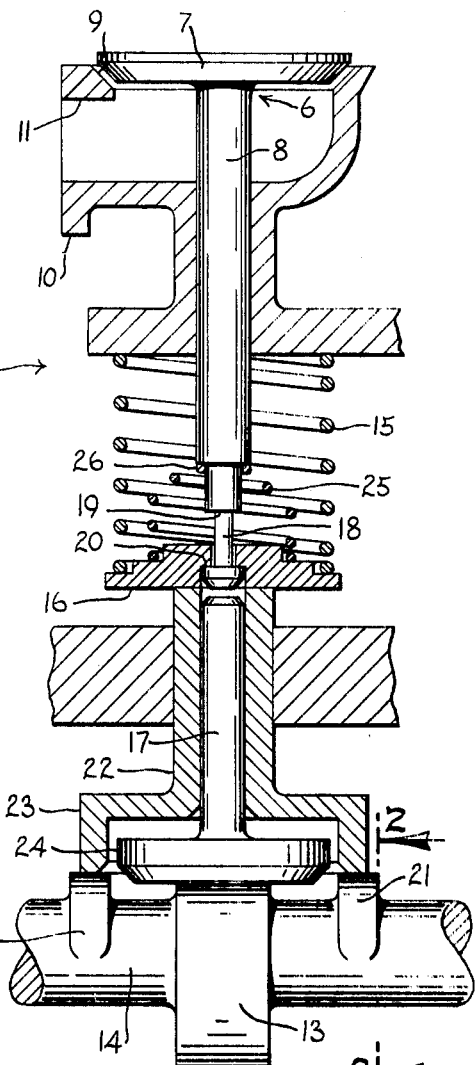
FIG. 1 is a view in side elevation of a valve and its actuating mechanism embodying the principles of this invention.
Figure 2:
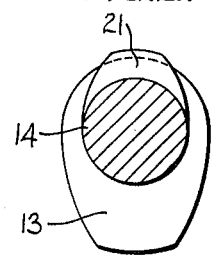
FIG. 2 is a cross-sectional view of the camshaft taken on the plane of the line 2–2 in FIG. 1.

Referring now to the accompanying drawings, the numeral 5 designates generally one of the valves that controls flow of gas to and from the combustion chamber of a four-stroke cycle engine, and the actuating mechanism for that valve. The valve itself, designated by 6, is a mushroom-shaped poppet having a head 7 and a coaxial stem 8 that extends from the head. The head of the valve cooperates with a seat 9 formed in the body 10 of the engine to control communication between a manifold 11 in the engine body (which can be either the exhaust manifold or the intake manifold) and the combustion chamber, the latter being designated by the space above the valve.

The valve is actuated in timed relation to the engine cycle by means of a generally conventional actuating mechanism comprising a cam 13 on a camshaft 14 and a relatively stiff spring 15 that reacts between a fixed part of the engine and a washerlike spring retainer 16 that is connected with the stem 8 of the valve. Interposed between the valve and the cam is a coaxial tappet 17.

Acting through the spring retainer, the spring 15 tends to maintain the valve engaged with the tappet 17 and the tappet engaged with the cam. The spring urges the valve in its closing direction, while the cam 13 moves the valve away from its seat and thus serves to establish the position of the valve during most portions of the engine cycle.

However, the connection between the valve and the spring retainer 16 is a lost motion connection that permits the valve to have limited motion relative to the spring retainer. The lost motion connection is provided by a reduced diameter neck portion 18 on the valve stem which extends with a freely slidable fit through the hole in the spring retainer and which defines oppositely facing shoulders or abutments 19 and 20 that are spaced-apart a distance greater than the thickness of the spring retainer and are engageable with it.

While the position of the valve itself is controlled by the cam 13, acting through the tappet 17, the position of the spring retainer 16 is controlled by a pair of cam elements 21 on the camshaft, axially spaced to opposite sides of the cam 13, in cooperation with a generally tubular auxiliary tappet 22 that surrounds the tappet 17. At its bottom the auxiliary tappet 22 has an inverted cup-shaped foot 23 that surrounds the foot 24 on the tappet itself, and the cam elements 21 engage the undersurface of this foot 23 at diametrically opposite points. The top of the auxiliary tappet defines a circumferential shoulder which engages the spring retainer around the valve stem hole therein. The auxiliary tappet does not interfere with movement of the valve relative to the spring retainer because the lower end portion of the valve stem is receivable in the bore in the auxiliary tappet.

The cam elements 21 engage the auxiliary tappet 22 through those portions of the engine cycle in which the valve is to be pressure responsive, and they then support the spring retainer 16 in a position such that the valve can move through a limited distance to and from engagement with its seat. At such times the spring retainer cooperates with the lower shoulder 20 on the valve stem to define the limit of free motion of the valve away from its seat, while the cam 13 so positions the tappet 17 that the valve can engage its seat with conventional tappet clearance, that is, with a slight spacing between the adjacent ends of the tappet and of the valve stem. In effect, therefore, the cam elements 21 cooperate with the auxiliary tappet 22 and the spring retainer 16 to disable the valve-actuating mechanism at predetermined times during the engine cycle when the valve is within a predetermined distance from its closed position.

For compression relief the valve must of course be lightly biased away from its seat, and to this end a small spring 25 bears against the valve to urge it in the opening direction. Since the spring 25 is effective only when the actuating mechanism for the valve is disabled, it can react either against a fixed part of the engine body or, as shown, against the spring retainer 16. The spring 25 can surround the valve stem, to be guided thereby, and can engage a downwardly facing circumferential shoulder 26 on the valve stem, spaced a distance above the neck 18.

During portions of the cycle in which the valve is not intended to be pressure responsive—that is, during conventional opening and closing motion of the valve and at times when it is intended to be kept closed—the cam elements 21 are out of engagement with the auxiliary tappet 22, and therefore the spring retainer 16 is unsupported so that the stiff spring 15 can maintain it engaged with the upwardly facing shoulder 20 on the valve stem. At such times the valve mechanism behaves exactly like a prior conventional one, in that the valve is under the complete control of the actuating mechanism comprising the spring 15 and cam 13. Hence, the cam 13 can be shaped like a prior conventional valve-actuating cam, to accelerate and decelerate the valve in its opening and closing motions as required to obtain best results.

Production of the mechanism of this invention presents no undue problems. With the spring retainer 16 firmly engaged against the lower shoulder 20 on the valve stem, the bottom of the valve stem and the bottom of the spring retainer are brought into flush relationship by grinding or machining whichever one is lower. Similarly, the tappet 17 and the auxiliary tappet 22 are coaxially assembled and maintained in a relationship such that one end of each (preferably the lower end) is flush with the corresponding end of the other, and while in that relationship the one that is longer is ground or otherwise finished to bring them to equal length. It is thus an easy matter to achieve a desired tappet clearance.

It will be apparent that the maximum opening that the valve can have in those portions of the cycle in which it is free for pressure responsive motion is determined by the difference in lift between the cam elements 21 and the cam 13.

For some engines, and particularly for small ones, the embodiment of the invention illustrated in FIG. 1 tends to present design problems related to the length of camshaft needed to accommodate the cam elements 21 and to possible interference between the connecting rod and the valve-actuating mechanism. These problems are overcome by the embodiment of the invention illustrated in FIGS. 3 and 4, which differs from that of FIG. 1 with respect to the cam and cam element and the foot portions of the tappet and auxiliary tappet.

Figure 3:
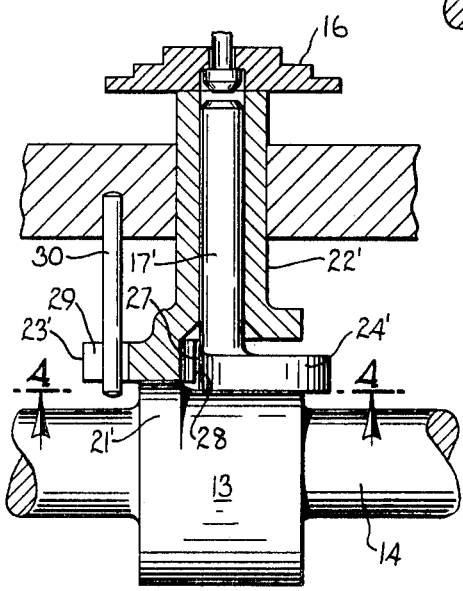
FIG. 3 is a fragmentary view in side elevation of a modified embodiment of the invention.
Figure 4:
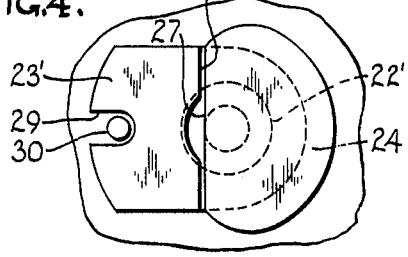
FIG. 4 is a sectional view taken on the plane of the line 4–4 in FIG. 3.

In the embodiment of FIGS. 3 and 4, the cam element 21', which controls the position of the spring retainer 16, is axially contiguous to the cam 13 which controls the position of the valve itself. To avoid having the cam element 21' engage the tappet 17', the latter has an asymmetrical foot portion 24' which projects away from the cam element 21' and which is slabbed off, as indicated at 27, along a plane touching the stem portion of the tappet at the side thereof nearest the cam element 21'. The auxiliary tappet 22' has a flat internal surface 28 on its foot portion 23' which opposes the flat surface 27 on the tappet, and these two flat surfaces, being spaced-apart by only a small distance, cooperate to prevent relative rotation between the tappet 17' and the tappet member 22'. The auxiliary tappet likewise has an asymmetrical foot portion 23' which, however, projects a small distance beyond the cam element 21', in the opposite direction to the foot portion 24' of the tappet, and is provided at its outer end with a guide pin groove 29. A guide pin 30, fixed in the engine body and extending parallel to the axes of the tappet and auxiliary tappet, is engaged in the groove 29 to prevent rotation of the auxiliary tappet.

From the foregoing description taken with the accompanying drawings it will be apparent that this invention provides a compression relief arrangement for a four-stroke cycle engine, whereby a valve that is free for pressure responsive motion during predetermined portions of the engine cycle is nevertheless kept under positive control of its actuating mechanism during all other portions of the cycle.

Those skilled in the art will appreciate that the invention can be embodied in forms other than as herein disclosed for purposes of illustration.

The invention is defined by the following claims:

We claim:

1. In a four-stroke cycle internal combustion engine having a camshaft rotatably driven in timed relation to the engine cycle, a poppet valve having a stem and a head engageable with a seat, and means for actuating the valve in timed relation to the engine cycle comprising a cam on the camshaft that moves the valve away from its seat, a spring which urges the valve towards its seat and which reacts between a fixed part on the engine and a spring retainer connected with the stem of the valve, and a tappet member coaxial with said stem and interposed between the valve and the cam:

A. cooperating means on the stem of said valve and on its spring retainer providing a lost motion connection between them which allows the valve to have limited motion relative to the spring retainer;

B. an auxiliary tappet member confined between the camshaft and the spring retainer, said auxiliary tappet member
  1. being guided for motion parallel to and adjacent to the tappet member,
  2. having an enlarged foot portion at its end adjacent the camshaft, and
  3. having a circumferential shoulder at its other end which engages the spring retainer around the valve stem; and
C. a cam element on the camshaft, axially adjacent to the cam and rotatable therewith, said cam element being cooperable with the foot portion of the auxiliary tappet member to so position the spring retainer, during a predetermined portion of the engine cycle in which the cam allows the valve to be closed, as to leave the valve substantially free for limited motion to and from engagement with its seat so that the valve can respond to differences between pressures inside and outside the cylinder and can therefore open slightly to relieve such pressure differences during starting of the engine.

2. The engine of claim 1 further characterized by:
A. said auxiliary tappet member being tubular and coaxially surrounding the tappet member;
B. the enlarged foot portion on the auxiliary tappet member being coaxial with the valve and the tappet member; and
C. said cam element comprising cam portions on the camshaft at axially opposite sides of the cam which engage diametrically opposite sides of said foot portion.

3. The engine of claim 1, further characterized by:
A. said tappet member having
  1. a stem portion, and
  2. an asymmetrical foot portion which extends to one side of its stem portion in one direction parallel to the cam shaft axis and which engages the cam;
B. the auxiliary tappet member having
  1. a tubular stem portion which coaxially surrounds the stem portion of the tappet member, and
  2. an asymmetrical foot portion which projects in the opposite direction parallel to the cam shaft axis and which engages the cam element;
C. cooperating noncircular surfaces on the foot portions of the tappet members by which they are prevented from rotating relative to one another; and
D. fixed guide means in the engine extending parallel to the stem portions of the tappet members and slidably engaged by one of said tappet members to prevent it from rotating.